United States Patent
Panella et al.

(10) Patent No.: US 8,281,710 B2
(45) Date of Patent: Oct. 9, 2012

(54) TUNNEL PASTEURISER

(75) Inventors: Graziano Panella, Grezzana (IT);
Andrea Solfa, Mezzane Di Sotto (IT)

(73) Assignee: Sidel Holdings & Technology SA, Pully (CH)

( * ) Notice: Subject to any disclaimer, the term of this patent is extended or adjusted under 35 U.S.C. 154(b) by 792 days.

(21) Appl. No.: 12/265,600

(22) Filed: Nov. 5, 2008

(65) Prior Publication Data

US 2009/0288565 A1  Nov. 26, 2009

(30) Foreign Application Priority Data

Nov. 8, 2007 (EP) .................................... 07120285

(51) Int. Cl.
*A23C 3/02* (2006.01)
*A23C 15/04* (2006.01)

(52) U.S. Cl. .............. 99/483; 99/453; 99/470; 426/407; 426/408; 426/521; 137/625.44

(58) Field of Classification Search .................... 432/18; 99/470, 452, 453, 456, 457, 458, 464, 465, 99/466; 426/665, 521; 141/35
See application file for complete search history.

(56) References Cited

U.S. PATENT DOCUMENTS

| | | | | |
|---|---|---|---|---|
| 1,177,621 A | * | 4/1916 | Hauk | 137/571 |
| 1,215,185 A | * | 2/1917 | Petry | 137/625.44 |
| 2,074,977 A | * | 3/1937 | Bird et al. | 209/155 |
| 2,621,484 A | * | 12/1952 | Frantisek | 405/93 |
| 3,543,916 A | * | 12/1970 | Berk | 198/367 |
| 4,441,406 A | * | 4/1984 | Becker et al. | 99/275 |
| 4,704,958 A | * | 11/1987 | Braymand | 99/470 |
| 4,796,523 A | * | 1/1989 | Mette | 99/470 |
| 4,849,235 A | | 7/1989 | Braymand | |
| 5,012,727 A | * | 5/1991 | Pesente | 99/470 |
| 5,750,174 A | * | 5/1998 | Lucassen | 426/521 |
| 5,772,958 A | | 6/1998 | Nielsen | |
| 6,142,065 A | * | 11/2000 | Panella et al. | 99/468 |
| 6,352,021 B1 | * | 3/2002 | Panella et al. | 99/468 |
| 2002/0170440 A1 | * | 11/2002 | Wakabayashi et al. | 99/453 |

FOREIGN PATENT DOCUMENTS

| | | |
|---|---|---|
| EP | 204138 A1 | 12/1986 |
| EP | 430907 A2 | 6/1991 |
| EP | 744903 A1 | 12/1996 |
| GB | 2182542 A | 5/1987 |
| IT | 1197934 B | 12/1988 |
| WO | WO95-22352 A1 | 8/1995 |

* cited by examiner

*Primary Examiner* — Gene Kim
*Assistant Examiner* — John E Simms, Jr.
(74) *Attorney, Agent, or Firm* — Pearne & Gordon LLP

(57) ABSTRACT

A tunnel pasteuriser comprises forward movement means (2) for moving products (3) to be pasteurised forward on a forward movement path along which there is a heating zone (4), a heat treatment zone (5) and a cooling zone (6). Each of said zones is divided into two or more sub-zones equipped with spraying means (10) for spraying a treatment liquid (11) onto the products (3) in transit in the sub-zone, and at least one tank (12) for collecting the liquid (11) that was sprayed on the products (3). In each heat treatment sub-zone (9) there are also means (20) for collecting the liquid (11) which wet the products (3) being treated. The collecting means (20) can be switched between a first operating condition in which they direct the liquid (11) collected towards the collection tank (12) of the relative heat treatment sub-zone (9), and a second operating condition in which they prevent the liquid (11) collected from reaching the tank (12) of the relative heat treatment sub-zone (9).

8 Claims, 5 Drawing Sheets

TUNNEL PASTEURISER

The present invention relates to a tunnel pasteuriser of the type for heat treating packaged products by spraying a liquid (usually water) at a controlled temperature on them.

In tunnel pasteurisers of this type, the products to be treated are moved forward at a constant speed along a forward movement path extending through, one after another, a heating zone, a heat treatment zone and a cooling zone.

Product forward movement is guaranteed by one or more conveyors, whilst each zone is divided into a plurality of basic sub-zones.

In turn, each sub-zone comprises spraying means positioned above the forward movement path, and at least one collection tank positioned below the forward movement path to collect the liquid, sprayed by the spraying means, after it has wet the products.

The method for feeding the liquid to the spraying means varies depending whether or not the sub-zone is in the heat treatment, heating or cooling zone. According to the most widespread current solutions, the liquid fed to the spraying means of the heating sub-zones is taken from the tanks of the cooling sub-zones, whilst the liquid fed to the spraying means of the cooling sub-zones is taken from the tanks of the heating sub-zones. In this way, it is possible to save the greater part of energy, since to heat the products in the heating zone it is possible to use the heat transferred to the operating liquid by the products in the cooling zones.

In contrast, in the heat treatment zone the liquid fed to the spraying means of each sub-zone is taken directly from the collection tank of that sub-zone.

Both in the heating zone and in the heat treatment zone, the steadiness of the temperature of the treatment liquid is guaranteed by suitable heating means connected to the relative collection tanks.

FIG. 1 shows the graph of the trend of temperatures in a tunnel pasteuriser having three sub-zones both for heating and for cooling, and four sub-zones for heat treatment. The case illustrated is a system intended for pasteurising bottled beer. The direction of product forward movement is from left to right, as shown by the arrow in the upper part of the graph.

The treatment liquid temperature trend in the various zones is indicated with the continuous line, linked to its temperature values.

The dotted line represents the theoretical temperature trend of the products treated.

One of the main problems for tunnel pasteurisers of the type described above is the risk of over-pasteurising products if the forward movement means accidentally stop.

When product forward movement is interrupted, in the absence of specific emergency action, the pasteurising of products located in the heat treatment zone would continue for an unspecified time consequently damaging the product treated (as well as wasting a considerable amount of energy).

To overcome this disadvantage, various solutions have been developed with the passage of time, such as those described for example in patents EP 744 903, U.S. Pat. No. 4,849,235, IT 1 197 934, EP 204 138 and EP 430 907.

In the greater part of the prior art solutions, to avoid over-pasteurising products following the unexpected pasteuriser stops, it is provided that the products present in the pasteurising zone are sprayed with colder water to bring their temperature to a value such that it avoids the risk of over-pasteurisation (usually this is a value just a few degrees below the pasteurising temperature).

Depending on the solutions, the cold water may be taken directly from the water system, from a special tank or taken from one of the heating or cooling zones. However, in all cases, the cold water is mixed with the hotter water contained in the tanks of the heat treatment zone, cooling it.

As a result, when the pasteuriser is able to restart (because the problem which caused the forward movement means to stop has been solved), in order to get the system operating regularly again, first the treatment temperature has to be re-established in the collection tanks of the heat treatment zone, either using heating means, or by taking hot water from a specific tank (for example as in patent EP 744 903).

However, in any case, the known solutions are not without disadvantages. First, all of the known solutions result in a waste of energy linked to cooling of the water contained in the tanks of the pasteurising zone, or to the need to always have ready a tank with water at a high temperature (such as 80° C.).

Second, at the moment when the pasteuriser restarts, all of the known systems require a relatively long transient state to return the water of the heat treatment sub-zones to the operating temperature.

In this situation, the technical purpose which forms the basis of the present invention is to provide a tunnel pasteuriser which overcomes the above-mentioned disadvantages.

In particular, the technical purpose of the present invention is to provide a tunnel pasteuriser in which the wasting of energy is minimised.

The present invention also has for a technical purpose to provide a tunnel pasteuriser in which switching from the normal operating state to the emergency state and vice versa is as fast as possible.

The technical purpose specified and the aims indicated are substantially achieved by a tunnel pasteuriser as described in the claims herein.

Further features and advantages of the present invention are more apparent in the detailed description below, with reference to several preferred, non-limiting embodiments of a tunnel pasteuriser, illustrated in the accompanying drawings, in which.

Figure 1:
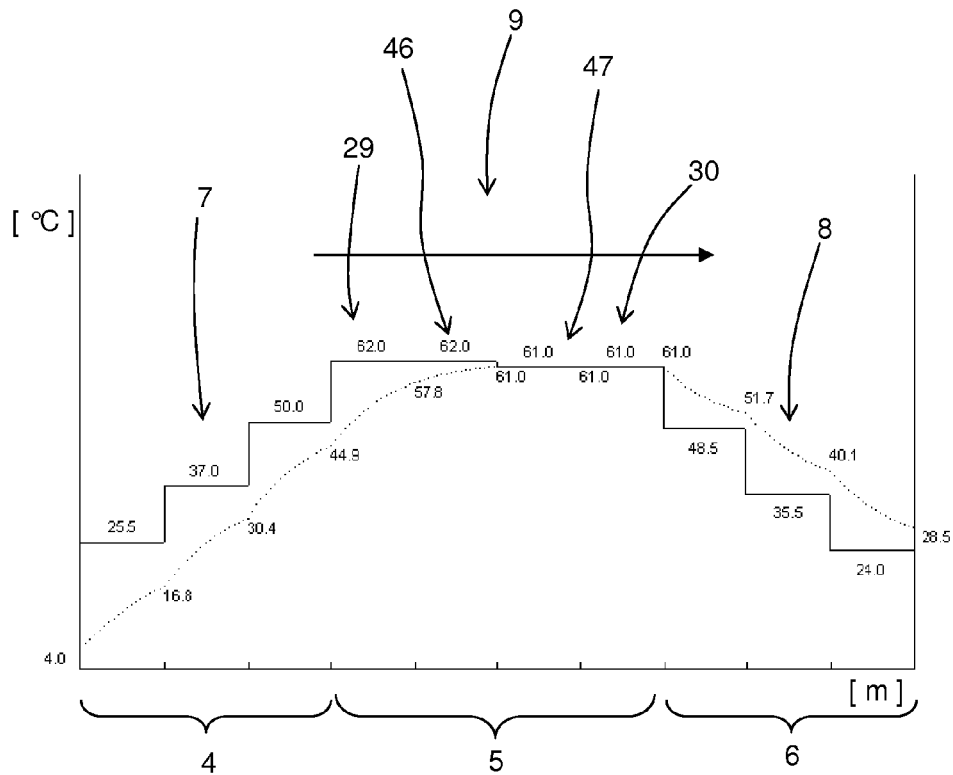
FIG. 1 is a standard graph of a tunnel pasteuriser operating regularly.

With reference to the accompanying drawings, the numeral 1 denotes as a whole a tunnel pasteuriser in accordance with the present invention.

The tunnel pasteuriser 1 comprises forward movement means 2, which may consist, for example, of one or more conveyor belts or any other type of conveyor, for moving the products 3 to be pasteurised forward (bottles in the accompanying drawings) along a forward movement path.

In the tunnel pasteuriser 1 there is a heating zone 4, a heat treatment zone 5 and a cooling zone 6 positioned one after another along the forward movement path. Each zone 4, 5, 6 is also divided into one or more sub-zones positioned one after another, respectively for heating 7, heat treatment 9 and cooling 8. Advantageously, each zone 4, 5, 6 contains at least two sub-zones 7, 14, 15, 16; 8, 17, 18, 19; 9, 29, 30, 46, 47.

Figure 2:
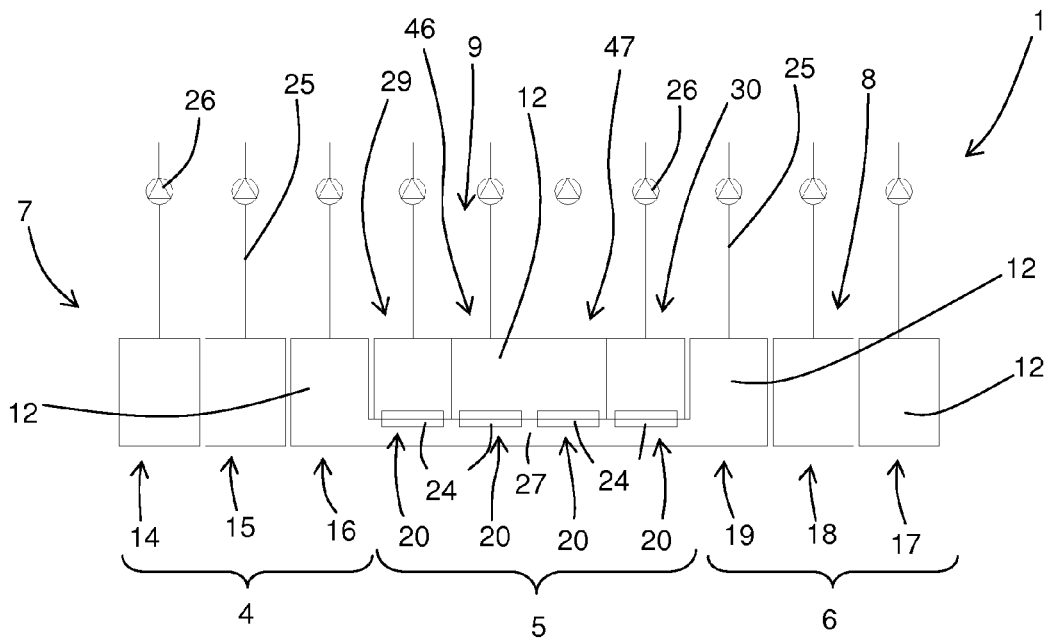
FIG. 2 is a schematic plan view of the layout of a tunnel pasteuriser made in accordance with the present invention.

In the case illustrated in FIG. 2, the tunnel pasteuriser 1 comprises three heating sub-zones 7 (14, 15, 16), three cooling sub-zones 8 (17, 18, 19) and four heat treatment sub-zones 9, (29, 30, 46, 47).

Each sub-zone 7, 8, 9 is equipped with spraying means 10 for spraying a treatment liquid 11 (advantageously water— indicated with three-dimensional arrows in the accompanying drawings) onto the products 3 in transit in the sub-zone 7, 8, 9, and at least one tank 12 for collecting the liquid 11 after it has been sprayed on the products 3.

Advantageously, the spraying means 10 and the collection tank 12 are positioned respectively above and below the forward movement path.

Moreover, in the known way, inserted between the forward movement path and the collection tank 12 there may be a filter for preventing dirt from infiltrating the treatment liquid 11 (not illustrated).

Treatment liquid 11 feeding to the spraying means 10 is guaranteed by specific feed means 13 connected both to the spraying means 10 and to the collection tanks 12. Depending on requirements, the feed means 13 feed the liquid 11 contained in each tank 12 to specific spraying means 10 of at least one of the sub-zones 7, 8, 9. For example, advantageously the liquid 11 contained in the tank 12 of the first, second and third heating sub-zones 14, 15, 16 (with reference to the direction of product 3 movement) may be fed to the spraying means 10 respectively of the last, penultimate and third last cooling sub-zones 17, 18, 19, and the liquid 11 contained in the tank 12 of the last, penultimate and third last cooling sub-zones 17, 18, 19 may be fed to the spraying means 10 respectively of the first, second and third heating sub-zones 14, 15, 16.

In contrast, each of the heat treatment sub-zones 9 is preferably managed independently with its own spraying means 10 directly connected to its own collection tank 12.

In accordance with the present invention, the tunnel pasteuriser 1 comprises, at the heat treatment sub-zones 9, means 20 for collecting the liquid 11 which allow recovery of the liquid 11 sprayed by the spraying means 10 after it has wet the products 3.

Moreover, said collecting means 20 can be switched between a first operating condition in which they direct the liquid 11 collected towards the collection tank is 12 of the relative heat treatment sub-zone 9, and a second operating condition in which they prevent the liquid 11 collected from reaching the tank 12 of the relative heat treatment sub-zone 9. Preferably, the collecting means 20 direct the liquid 11 collected towards at least the heating zone 4 or the cooling zone 6 when they are in the second operating condition.

Figure 4:
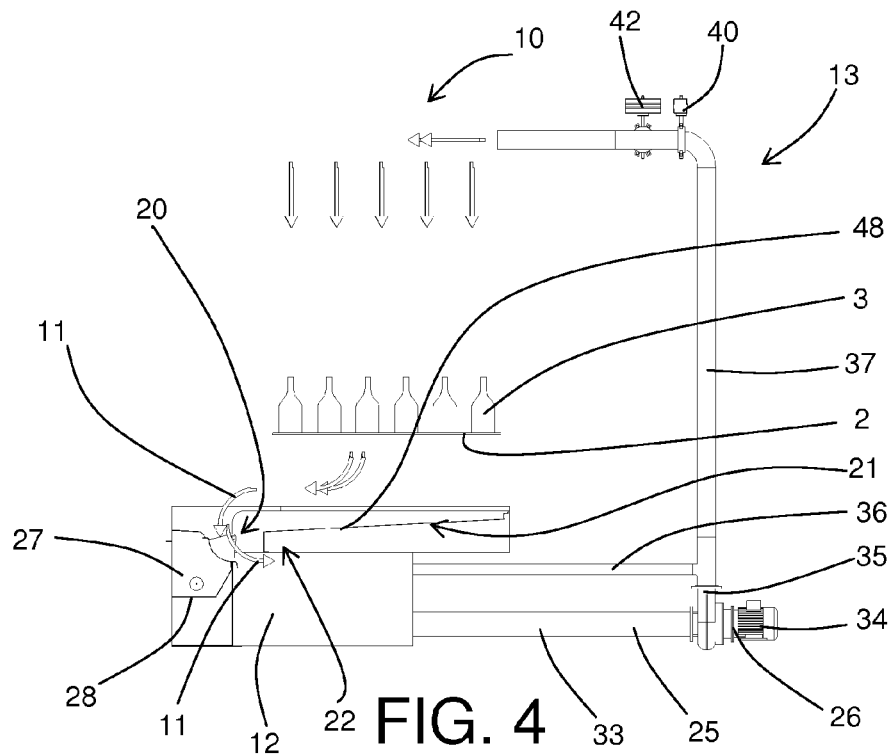
FIG. 4 is a front view of the portion of tunnel pasteuriser of FIG. 3.
Figure 7:
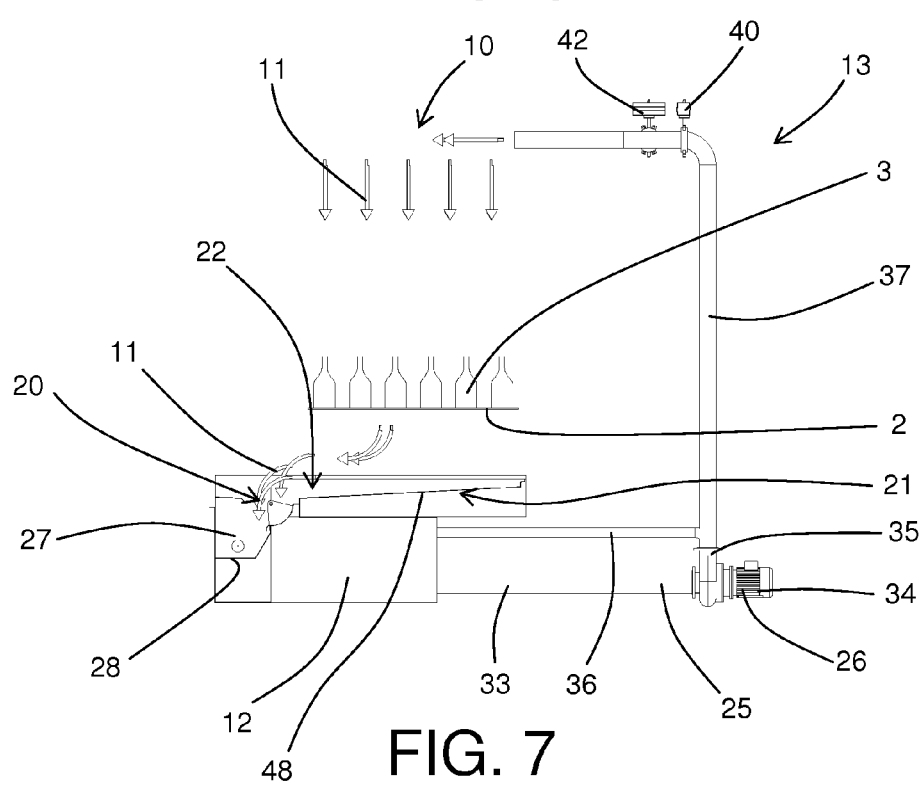
FIG. 7 is a front view of the portion of tunnel pasteuriser of FIG. 6.

In general, the collecting means 20 comprise a structure 21 for intercepting the flow of the liquid 11 dripping from the products 3 treated, an intercepting structure 21 which, in the embodiment illustrated, consists of an angled panel 48 positioned between the forward movement means 2 and the collection tank 12. In the accompanying drawings, the intercepting structure 21 is made in such a way that it causes the liquid 11 collected to flow into a collecting zone 22 from where it can be sorted towards the appropriate collection tank 12. The angled panel 48 directs the flow of liquid 11 towards its edge 23 positioned above the tank 12 at a predetermined distance (horizontally, parallel with the product 3 forward movement path) from the edge 23a of the tank 12 (FIGS. 4 and 7). In this way, in the absence of further elements, the liquid 11 drained from the edge 23 would fall directly into the collection tank 12 of the relative sub-zone.

However, depending on requirements, there may be many alternative embodiments of the collecting means 20 of the present invention.

For example, the intercepting structure 21 may be made as an element able to move and/or switch between a first operating condition and a second operating condition (solutions not illustrated). Or, when it is in the first operating condition the intercepting structure 21 may drain the liquid 11 collected into the collection tank 12 of the relative heat treatment sub-zone 9 and when it is in the second operating condition it may drain the liquid 11 towards the heating zone 4 or the cooling zone 6.

Alternatively, the intercepting structure 21 may consist of a fixed element and the collecting means 20 may comprise suitable devices associated with the collecting zone 22 for suitably directing the liquid 11 collected.

Such devices may for example consist either of suitable ducts fitted with controlled valves (solution not illustrated) or an element 24 able to move between a first and a second position (solution illustrated in the accompanying drawings). In particular, in the embodiment illustrated, the movable element 24 consists of an extended partition having a circular arc cross-section.

Figure 3:
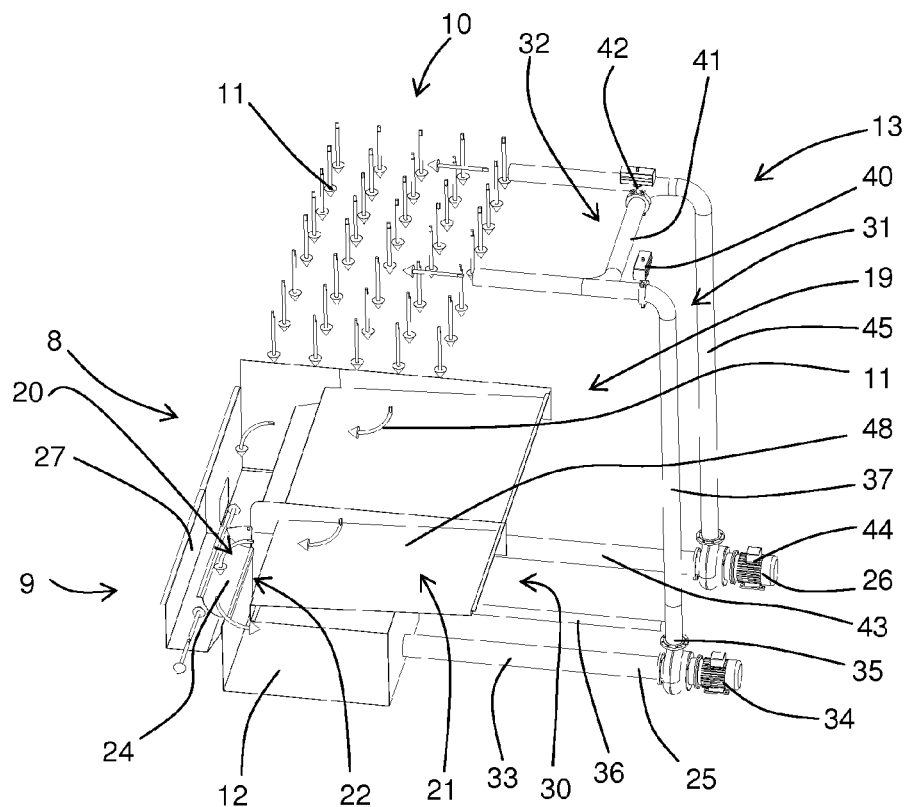
FIG. 3 is a schematic axonometric view of a portion of a tunnel pasteuriser made in accordance with the present invention in the condition in which it is operating regularly, with some parts cut away to better illustrate others.
Figure 8:
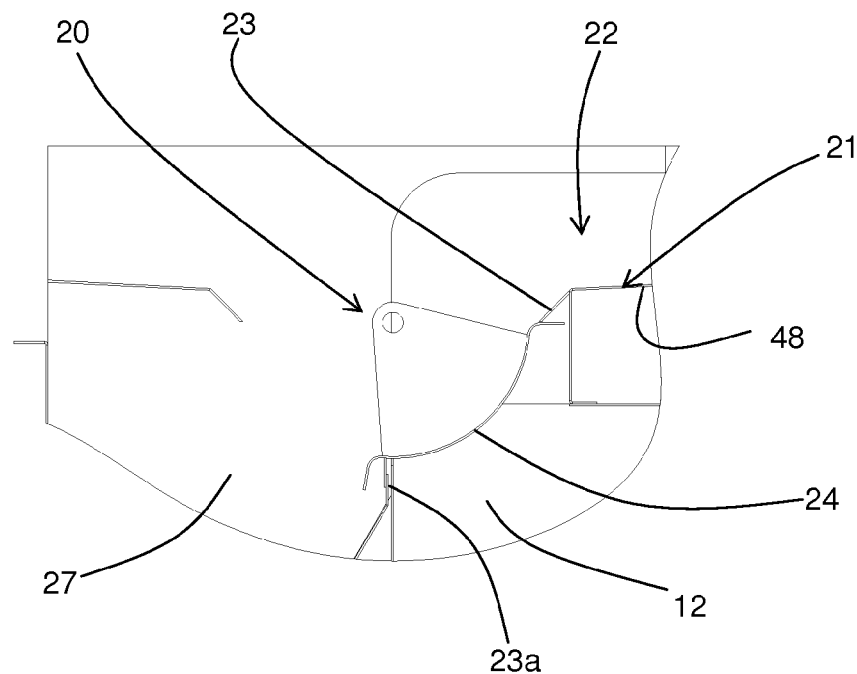
FIG. 8 is an enlarged detail of the pasteuriser of FIG. 7.
Figure 5:
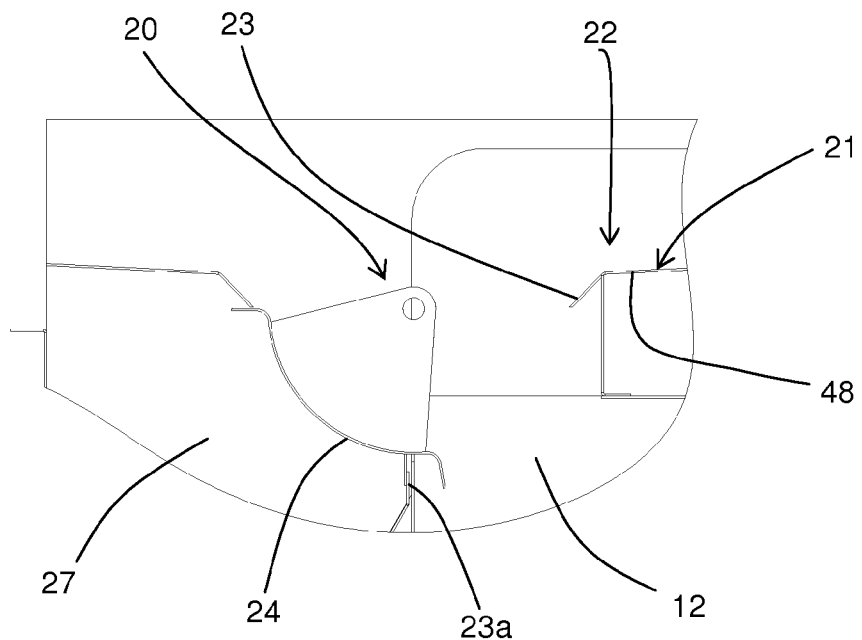
FIG. 5 is an enlarged detail of the pasteuriser of FIG. 4.
Figure 6:
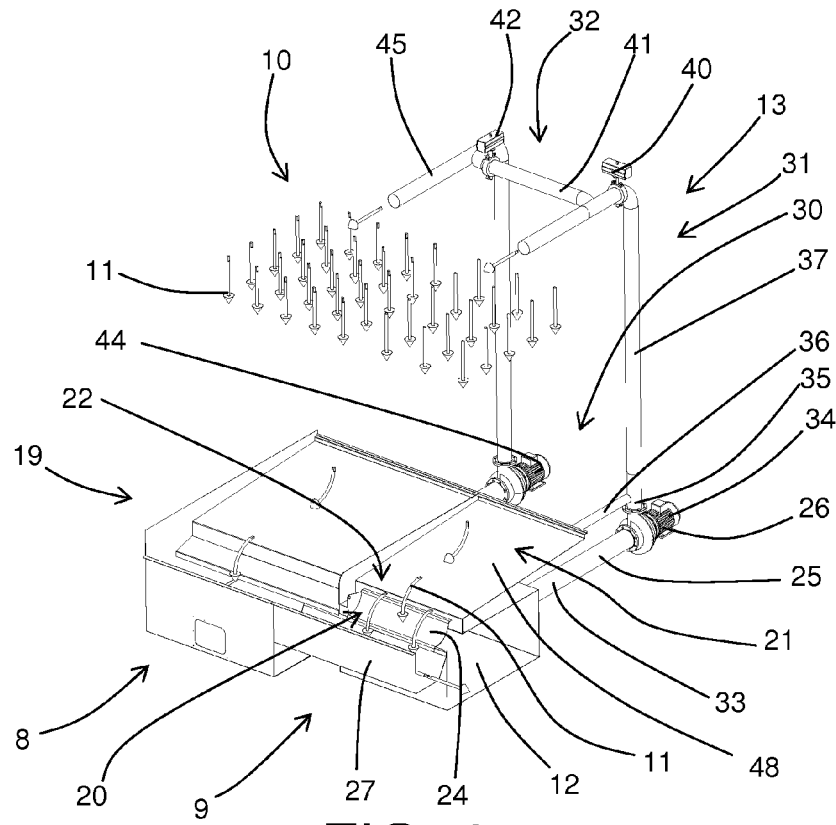
FIG. 6 is a schematic axonometric view of the portion of tunnel pasteuriser of FIG. 3 in the emergency operating condition.

When the movable element 24 is in the first position, it allows the liquid 11 used to wet the products 3 to be treated in a predetermined heat treatment sub-zone 9 to be collected in the tank 12 of that sub-zone (FIGS. 3-5). In contrast, when the movable element 24 is in the second position, it prevents the liquid 11 from being collected in the sub-zone tank 12 and directs it towards the heating zone 4 or the cooling zone 6 (FIGS. 6-8).

In the embodiments illustrated the movable element 24 can move from the first to the second position by a rotation according to an axis of rotation lying in a plane parallel with the forward movement path of the products 3 to be pasteurised, and in particular parallel with the direction of forward movement of the products 3 to be treated.

Moreover, in the embodiments illustrated, the movable element 24 is made in such a way that it directs the liquid 11 directly into a collection tank 12 of at least one sub-zone of the heating zone 4 and the cooling zone 6. However, in other embodiments, the liquid 11 may be directed towards the tanks 12 indirectly.

FIG. 2 shows a plan view of the schematic layout of the position of the tanks 12 of the different zones of the tunnel pasteuriser 1, highlighting, for each tank 12 the liquid 11 drawing duct 25 (with relative pump 26), and, for each tank 12 of the heat treatment sub-zones 9, the relative movable element 24. In that embodiment, each heat treatment sub-zone 9 has its own independent movable element 24.

In the embodiment illustrated, when it is in its second position, the movable element 24 is positioned in such a way that it directs the operating liquid 11 towards the tank 12 of one of the two sub-zones closest to the heat treatment zone 5, that is to say the last heating sub-zone 7 or the first cooling sub-zone 8. This is achieved by means of at least one auxiliary tank 27 connected between the tank 12 of the heating sub-zone 7 closest to the heat treatment zone 5 (here the third heating sub-zone 16) and the tank 12 of the cooling sub-zone 8 closest to the heat treatment zone 5 (here the third last cooling sub-zone 19). Said auxiliary tank 27 is positioned in such a way that it is adjacent to the tanks 12 of the heat treatment sub-zones 9, so that when the movable element 24 is in its second position, it can direct the liquid 11 which wet the products 3 to be treated into the auxiliary tank 27.

Advantageously, each movable element 24 is placed at the lower edge 23 of the angled panel 48 and, when in the second position, forms an extension of it above the auxiliary tank 27, so that the treatment liquid 11 is directed directly into the auxiliary tank 27.

Moreover, in the accompanying drawings the auxiliary tank 27 extends parallel with the product 3 forward movement path and connects the tank 12 of the heating sub-zone 7 closest to the heat treatment zone 5 and the tank 12 of the cooling sub-zone 8 closest to the heat treatment zone 5. However, in other embodiments, there may also be two or more separate auxiliary tanks 12 connected either to the tank 12 of the heating sub-zone 7 closest to the heat treatment zone 5 or to the tank 12 of the cooling sub-zone 8 closest to the heat treatment zone 5.

Moreover, in the embodiment illustrated, the auxiliary tank 27 consists of a channel whose base 28 is at a level preferably equal to or slightly lower than the normal level of the liquid 11 in the collection tanks 12 to which it is connected. In addition, the collecting means 20 of the first and last heat treatment sub-zones 29, 30 may drain the liquid 11 directly, respectively, into the tank 12 of the heating sub-zone 7 closest to the heat treatment zone 5 and into the tank 12 of the cooling sub-zone 8 closest to the heat treatment zone 5. This may be achieved by angling the angled panel 48 towards said sub-zones 16, 19 and positioning the axis of rotation of the movable element 24 parallel with a direction transversal to the direction of product 3 forward movement.

In the preferred embodiments the feed means 13 comprise, for each sub-zone 9 of the heat treatment zone 5, at least a first system 31 for feeding the liquid 11 to the spraying means 10, connected to the collection tank 12 of that sub-zone 9, and at least a second system 32 for feeding the liquid 11 to the spraying means 10, instead connected to the collection tank 12 of a sub-zone 7, 8 of the heating zone 4 or of the cooling zone 6. The first system 31 and the second system 32 may be completely separate or partly coincide, either relative to one another or relative to those of the other sub-zones 7, 8, 9. In particular, in the preferred embodiment, the first system 31 consists of the feed means 13 of a heating sub-zone 7 or a cooling sub-zone 8 and of a duct, fitted with a controlled valve, derived from the feed means 13 of the heating sub-zone 7 or the cooling sub-zone 8.

Figure 9:
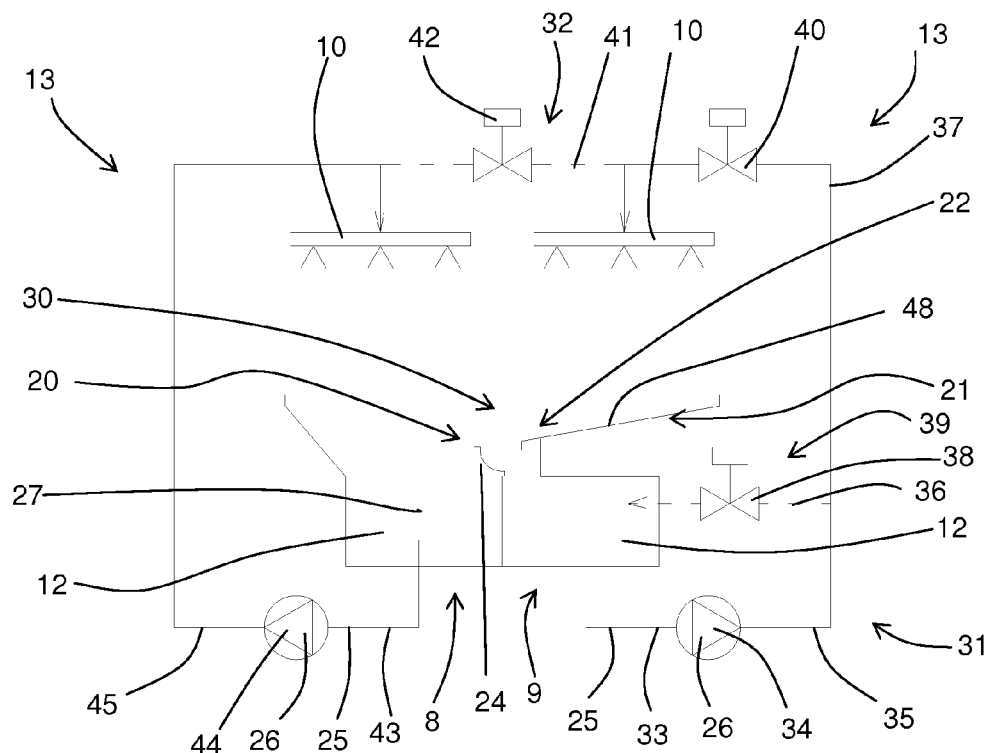
FIG. 9 is a simplified qualitative diagram of the plant engineering of the portion of pasteuriser of FIG. 3.
Figure 10:
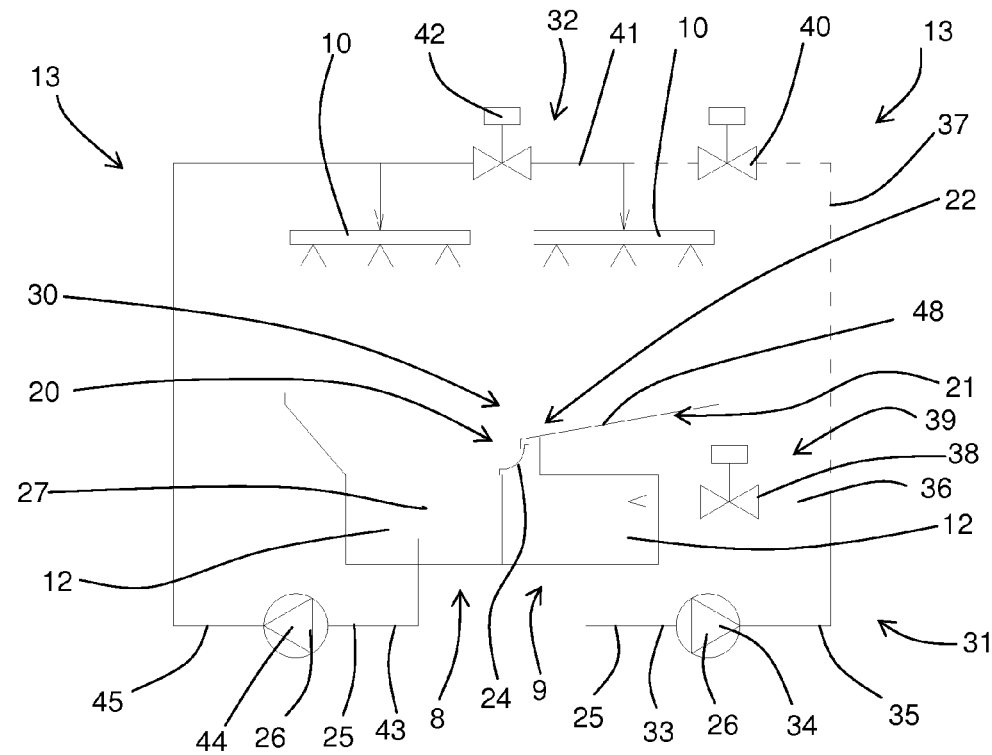
FIG. 10 is a simplified qualitative diagram of the plant engineering of the portion of pasteuriser of FIG. 6.

FIGS. 9 and 10 schematically illustrate the above relative to the portion of tunnel pasteuriser 1 in FIGS. 3 and 6 which show the last heat treatment sub-zone 30 and the first cooling sub-zone 19.

FIG. 9 shows regular operation with the movable element 24 in its first position. For simplicity, the collecting tanks 12 of the two sub-zones 19, 30 are illustrated as being adjacent, although in reality the auxiliary tank 27 is adjacent, in fluid communication with the tank 12 of the cooling sub-zone 19 and/or the heating sub-zone 16.

As shown, the heat treatment sub-zone 9 has a first system 31 for feeding the liquid 11 from the tank 12 to the spraying means 10, comprising a first intake duct 33 on which a first pump 34 is fitted, feeding a first delivery duct 35 which splits into a first branch 36 and a second branch 37. The first branch 36, intercepted by a first controlled valve 38, drains directly into the tank 12 of the heat treatment sub-zone 30, and forms a third system 39, for recirculating the liquid 11 contained in the collection tank 12 of that sub-zone 30 (whose use is described in more detail below). The second branch 37, intercepted by a second controlled valve 40, is connected to the spraying means 10 of the heat treatment sub-zone 9.

Joining the second branch 37, downstream of the second valve 40, there is a third branch 41, in turn intercepted by a third controlled valve 42, derived from the system for feeding the liquid 11 to the spraying means 10 of the cooling sub-zone 19. The latter system in turn comprises a second intake duct 43 on which a second pump 44 is fitted, sending the liquid 11 in a second delivery duct 45 connected to the relative spraying means 10. The above-mentioned third branch 41 derives from the second delivery duct 45.

When the pasteuriser is operating regularly (FIG. 9), the first and third valves 38, 42 are closed, whilst the second valve 40 is open (the fact that valves are closed is shown by drawing the relative branches of duct with a dashed line rather than a continuous line).

In this way, the first system 31 is active and allows the liquid 11 to pass, whilst the second and third systems 32, 39 are stopped.

Consequently, the feed means 13 of the heat treatment sub-zone 9 and of the cooling sub-zone 8 feed the spraying means 10 of the respective sub-zones.

If product 3 forward movement is interrupted, causing the risk of over-pasteurising, the movable element 24 is moved to the second position, the second valve 40 is closed and the first and third valves 38, 42 are opened.

In this way, the first system 31 no longer operates, whilst the second and third systems 32, 39 begin operating.

Consequently, the spraying means 10 of the heat treatment sub-zone 30 and of the cooling sub-zone 19 are all fed simultaneously with the liquid 11 taken from the tank 12 of the cooling sub-zone 19. At the same time, the liquid 11 of the tank 12 of the heat treatment sub-zone 30 is kept mixed, to prevent thermal gradients, thanks to the use of the third system 39.

Obviously, FIGS. 9 and 10 show only one possible alternative embodiment of the feed means 13 according to requirements.

In general, the tunnel pasteuriser 1 comprises a control system (not illustrated) operatively connected at least to the collecting means 20 and to the feed means 13 so that, in case of risk of over-pasteurising caused by the interruption of forward movement means 2, commands can be issued to switch the collecting means 20 from the first operating condition to the second operating condition, and feed the spraying means 10 of the heat treatment sub-zones 9 with liquid 11 from at least one sub-zone belonging to the heating zone 4 or to the cooling zone 6, rather than with liquid 11 from the treatment sub-zone 9.

Moreover, in the known way, the tunnel pasteuriser 1 comprises, in each sub-zone 7, 8, 9, temperature control means (of the known type and therefore not illustrated) for keeping the temperature of the liquid 11 fed on the spraying means 10 of that sub-zone at a preset level at least during regular operation. The temperature control means allow, moreover, to keep also the temperature of liquid 11 in the tanks 12 of the heat treatment sub-zones 9 at a certain preset level during emergency operation.

The present invention brings important advantages.

First, thanks to the present invention it was possible to prevent practically any mixing between the hotter liquid used in the treatment sub-zones during normal operation and the relatively cold liquid used in emergency situations. Consequently, it was possible to eliminate any waste of energy linked to cooling due to mixing of the liquid contained in the heat treatment tanks.

Secondly, the present invention allows the use of a specific overheated tank such as, for example, in the case of patent EP 744 903, to be avoided.

In addition, thanks to the present invention, the heat lost by products during the emergency action is not wasted but is accumulated in the liquid of the heating or cooling sub-zones involved. Consequently, the moment when the system restarts said heat is recovered during the heating step.

It should be noticed that thanks to the present invention, even the time needed to switch from regular operation to emergency operation is practically null.

It should also be noticed that the present invention is relatively easy to produce and even the cost linked to implementation of the invention is not very high.

The invention described above may be modified and adapted in several ways without thereby departing from the scope of the inventive concept.

All details of the invention may be substituted by other technically equivalent elements and, in practice, all of the materials used, as well as the shapes and dimensions of the various components, may be any according to requirements.

The invention claimed is:

1. A tunnel pasteuriser (1) comprising:
    forward movement means (2) for moving products (3) to be pasteurised forward along a forward movement path;
    a heating zone (4), a heat treatment zone (5) and a cooling zone (6) positioned one after another along the forward movement path, each of the zones being divided into at least two sub-zones positioned one after another, respectively for heating, heat treatment and cooling; each sub-zone also comprising spraying means (10) for spraying a treatment liquid (11) on the products (3) in transit in the sub-zone, and at least one tank (12) for collecting the liquid (11) that was sprayed on the products (3),
    feed means (13) connected to the spraying means (10) and to the tanks (12) for feeding the liquid (11) contained in each tank (12) to specific spraying means (10) of at least one of the sub-zones;
    the tunnel pasteuriser being characterised in that it also comprises, at each heat treatment sub-zone (9), collecting means (20) for collecting the liquid (11) which wet the products (3) being treated, which collecting means (20) are able to switch between a first operating condition in which they direct the liquid (11) collected towards the collection tank (12) of the relative heat treatment sub-zone (9), and a second operating condition in which they prevent the liquid (11) collected from reaching the tank (12) of the relative heat treatment sub-zone (9) and in which they direct the liquid (11) directly or indirectly into a collection tank (12) of at least one sub-zone of the heating and cooling zones (4, 6); the collecting means (20) comprising at least one element (24) able to move between a first position in which it allows the liquid (11) which wet the products (3) to be treated in a predetermined sub-zone to be collected in the tank (12) of that sub-zone, and a second position in which it prevents that liquid (11) from being collected in the tank (12) of the sub-zone and directs it towards at least the heating zone (4) or the cooling zone (6); said movable element (24) can move from the first to the second position by means of rotation and said rotation occurs according to an axis of rotation lying in a plane parallel with the forward movement path of the products (3) to be pasteurised;
    at least one auxiliary tank (27) connected to at least the tank (12) of the heating sub-zone (7) closest to the heat treatment zone (5) or the tank (12) of the cooling sub-zone (8) closest to the heat treatment zone (5) and positioned adjacent to the tank (12) of at least one of the heat treatment sub-zones (9), said movable element (24) is in its second position, directs the liquid (11) which wet the products (3) to be treated into the auxiliary tank (27);
    the collecting means (20) comprising an intercepting structure (21) for intercepting the flow of the liquid (11) dripping from the products (3) treated; the intercepting structure (21) consisting of an angled panel (48) positioned between the forward movement means (2) and the collection tank (12); the movable element (24), when in the second position, being placed at a lower edge (23) of the angled panel (48) above the auxiliary tank (27), so that the treatment liquid (11) is directed directly into the auxiliary tank (27).

2. The tunnel pasteuriser according to claim 1, characterised in that when they are in the second condition the collecting means (20) direct the liquid (11) directly or indirectly into a collection tank (12) of at least one sub-zone of the heating and cooling zones (4, 6).

3. The tunnel pasteuriser according to claim 2 characterised in that the auxiliary tank (27) extends parallel with the product (3) forward movement path and connects the tank (12) of the heating sub-zone (7) closest to the heat treatment zone (5) and the tank (12) of the cooling sub-zone (8) closest to the heat treatment zone (5).

4. The tunnel pasteuriser according to claim 1, characterised in that the feed means (13) comprise, for each sub-zone of the heat treatment zone (5), at least a first system (31) for feeding the liquid (11) to the spraying means (10) connected to the collection tank (12) of that sub-zone, and at least a second system (32) for feeding the liquid (11) to the spraying means (10) connected to the collection tank (12) of a sub-zone of the heating zone (4) or of the cooling zone (6).

5. The tunnel pasteuriser according to claim 4, characterised in that the feed means (13) also comprise, for each sub-zone of the heat treatment zone (5), at least a third system (39) for recirculating the liquid (11) contained in the collection tank (12) of that sub-zone.

6. The tunnel pasteuriser according to claim 4 characterised in that the first system (31) comprises a duct fitted with a controlled valve derived from the feed means (13) of a heating sub-zone (7) or a cooling sub-zone.

7. The tunnel pasteuriser according to claim 1 characterised in that it also comprises a control system operatively connected at least to the collecting means (20) and to the feed means (13) so that commands can be issued to switch the collecting means (20) from the first operating condition to the second operating condition, and feed the spraying means (10) of the heat treatment sub-zones (9) with liquid (11) from at least one sub-zone belonging to the heating zone (4) or to the cooling zone (6).

8. The tunnel pasteuriser according to claim 1 characterised in that it also comprises, in each sub-zone, temperature control means for keeping the temperature of the liquid (11) at a preset level.

* * * * *